US012600833B2

(12) United States Patent
Hara et al.

(10) Patent No.: US 12,600,833 B2
(45) Date of Patent: Apr. 14, 2026

(54) COVER FILM

(71) Applicant: FUJIFILM Corporation, Tokyo (JP)

(72) Inventors: Miyoko Hara, Kanagawa (JP); Takato Suzuki, Kanagawa (JP); Yasuyuki Sasada, Kanagawa (JP); Akio Tamura, Kanagawa (JP); Reiko Inushima, Kanagawa (JP)

(73) Assignee: FUJIFILM Corporation, Tokyo (JP)

(*) Notice: Subject to any disclaimer, the term of this patent is extended or adjusted under 35 U.S.C. 154(b) by 149 days.

(21) Appl. No.: 18/615,743

(22) Filed: Mar. 25, 2024

(65) Prior Publication Data

US 2024/0228715 A1 Jul. 11, 2024

Related U.S. Application Data

(63) Continuation of application No. PCT/JP2022/035042, filed on Sep. 21, 2022.

(30) Foreign Application Priority Data

Sep. 30, 2021 (JP) ................................ 2021-160761

(51) Int. Cl.
*C08J 7/04* (2020.01)

(52) U.S. Cl.
CPC ........... *C08J 7/042* (2013.01); *C08J 2333/10* (2013.01)

(58) Field of Classification Search
None
See application file for complete search history.

(56) References Cited

U.S. PATENT DOCUMENTS

2015/0346409 A1 12/2015 Nagura et al.

FOREIGN PATENT DOCUMENTS

| | | | | |
|---|---|---|---|---|
| CN | 104105748 | A | | 10/2014 |
| JP | S61-140915 | A | | 6/1986 |
| JP | S61-254916 | A | | 11/1986 |
| JP | H09-263744 | A | | 10/1997 |
| JP | H11-101943 | A | | 4/1999 |
| JP | 2011107240 | A | * | 6/2011 |
| WO | 99/53357 | A1 | | 10/1999 |
| WO | 2021/187262 | A1 | | 9/2021 |

OTHER PUBLICATIONS

Machine translation of JP 2011-107240 A (Year: 2011).*
The extended European search report issued by the European Patent Office on Dec. 9, 2024, which corresponds to European Patent Application No. 22875944.5-1102 and is related to U.S. Appl. No. 18/615,743.
International Search Report issued in PCT/JP2022/035042; mailed Dec. 6, 2022.
International Preliminary Report on Patentability (Chapter I) and Written Opinion of the International Searching Authority issued in PCT/JP2022/035042; mailed Apr. 2, 2024.
Office Action issued in CN 202280065269.0; mailed by the State Intellectual Property Office of the People's Republic of China on Oct. 30, 2025.

* cited by examiner

*Primary Examiner* — Ramsey Zacharia
(74) *Attorney, Agent, or Firm* — Studebaker Brackett PLLC

(57) ABSTRACT

An object of the present invention is to provide a cover film in which chips during cutting are unlikely to be generated, voids during bonding to a substrate using an enclosing solution are unlikely to be generated, and adhesiveness with the substrate is excellent. The cover film of the present invention is used for covering a test subject on a substrate, the cover film including a support and a polymer layer containing a polymer, in which a fracture toughness value of the polymer layer is 0.2 $MPa \cdot m^{0.5}$ or more, an in-plane retardation of the support at a wavelength of 590 nm is 1,000 nm or less, and a requirement regarding a dissolution rate of the polymer layer in xylene and a requirement regarding a viscosity of a xylene solution of the polymer layer are satisfied.

11 Claims, No Drawings

COVER FILM

CROSS-REFERENCE TO RELATED APPLICATIONS

This application is a Continuation of PCT International Application No. PCT/JP2022/035042 filed on Sep. 21, 2022, which claims priority under 35 U.S.C. § 119(a) to Japanese Patent Application No. 2021-160761 filed on Sep. 30, 2021. The above applications are hereby expressly incorporated by reference, in their entirety, into the present application.

BACKGROUND OF THE INVENTION

1. Field of the Invention

The present invention relates to a cover film.

2. Description of the Related Art

A method of automatically overlapping a substrate on which a test subject is placed with a cover film using an automatic enclosing device to adhere (hereinafter, also referred to as "enclose") the cover film and the substrate, the cover film including a polymer layer on a support in advance, the substrate being a substrate (a glass slide or the like) onto which few drops of a solvent capable of swelling and/or dissolving the polymer layer (also referred to as "enclosing solution"; for example, xylene or the like) is dropped, has been known. According to this method, it is possible to produce a specimen for microscopic observation, in which the test subject is fixed between the substrate and the cover film.

For example, JP1999-101943A (JP-H11-101943A) discloses a cover film for a microscope, which is obtained by providing a polymer adhesive layer having a glass transition temperature of 50° C. or higher on a transparent support, the cover film containing a silane coupling agent on a surface of the polymer adhesive layer and/or in the polymer adhesive layer.

SUMMARY OF THE INVENTION

In the above-described automatic enclosing device, since the cover film is often used by being cut, it is required that chips are not generated during cutting of the cover film.

In addition, in a case where the cover film is bonded to the substrate on which the test subject is placed using the enclosing solution, it is also required that voids are hardly generated from the viewpoint of observability.

Furthermore, from the viewpoint of handleability and the like, it is also required that the cover film has excellent adhesion to the substrate after enclosing.

As a result of studies on the cover film disclosed in JP1999-101943A (JP-H11-101943A), the present inventors have found that the cover film cannot satisfy the above-described requirements. In particular, in the cover film disclosed in JP1999-101943A (JP-H11-101943A), the voids are generated.

Therefore, an object of the present invention is to provide a cover film in which chips during cutting are unlikely to be generated, voids during bonding to a substrate using an enclosing solution are unlikely to be generated, and adhesiveness with the substrate is excellent.

The present inventors have completed the present invention as a result of intensive studies to solve the above-described problems. That is, the present inventors have found that the above-described objects can be achieved by the following configuration.

[1] A cover film used for covering a test subject on a substrate, the cover film comprising:

a support; and a polymer layer containing a polymer, in which a fracture toughness value of the polymer layer is 0.2 $MPa \cdot m^{0.5}$ or more, an in-plane retardation of the support at a wavelength of 590 nm is 1,000 nm or less, and a requirement 1 and a requirement 2 are satisfied, the requirement 1: a dissolution rate of the polymer layer in xylene is 0.01 to 0.25 $g \cdot m^{-2} \cdot s^{-1}$, the requirement 2: in a case where a viscosity of a xylene solution having a concentration of solid contents of 20%, which is obtained by dissolving the polymer layer in xylene, at 25° C. is defined as X, 1/X is 0.005 to 0.060 $cP^{-1}$.

[2] The cover film according to [1], in which the dissolution rate in xylene is 0.01 to 0.15 $g \cdot m^{-2} \cdot s^{-1}$, and the 1/X is 0.010 to 0.060 $cP^{-1}$.

[3] The cover film according to [1] or [2], in which a weight-average molecular weight of the polymer is 50,000 to 140,000.

[4] The cover film according to any one of [1] to [3], in which a glass transition temperature of the polymer layer is 60° C. or higher.

[5] The cover film according to any one of [1] to [4], in which the polymer is a polymer including at least two repeating units derived from a monomer selected from the group consisting of an acrylate monomer and a methacrylate monomer.

[6] The cover film according to any one of [1] to [5], in which the polymer is a polymer including at least two repeating units derived from a monomer selected from the group consisting of methyl methacrylate, ethyl acrylate, ethyl methacrylate, 2-methoxyethyl methacrylate, n-butyl methacrylate, i-butyl methacrylate, t-butyl methacrylate, benzyl acrylate, 2-ethylhexyl methacrylate, and lauryl methacrylate.

[7] The cover film according to any one of [1] to [6], in which the polymer includes a repeating unit derived from ethyl acrylate and a repeating unit derived from ethyl methacrylate.

According to the present invention, it is possible to provide a cover film in which chips during cutting are unlikely to be generated, voids during bonding to a substrate using an enclosing solution are unlikely to be generated, and adhesiveness with the substrate is excellent.

DESCRIPTION OF THE PREFERRED EMBODIMENTS

Hereinafter, the present invention will be described in detail.

The description of the configuration requirements described below is made on the basis of representative embodiments of the present invention, but it should not be construed that the present invention is limited to those embodiments.

Hereinafter, the meaning of each description in the present specification will be described.

Any numerical range expressed using "to" in the present specification refers to a range including the numerical values before and after the "to" as a lower limit value and an upper limit value, respectively. In a range of numerical values described in stages in the present specification, the upper limit value or the lower limit value described in a certain range of numerical values may be replaced with an upper limit value or a lower limit value of the range of numerical values described in other stages. In addition, regarding the numerical range described in the present specification, an upper limit value or a lower limit value described in a numerical value may be replaced with a value described in Examples.

In the present specification, a combination of two or more preferred aspects is a more preferred aspect.

In the present specification, in a case where a plurality of substances corresponding to each component in a composition is present, the amount of each component in the composition or in the layer means the total amount of the plurality of substances present in the composition, unless otherwise specified.

In the present specification, "(meth)acryl" is a generic term including acryl and methacryl, and means "at least one of acryl or methacryl". Similarly, "(meth)acrylate" means "at least one of acrylate or methacrylate".

In the present specification, unless specified otherwise, a refractive index refers to a value which is measured using NAR-2T manufactured by Atago Co., Ltd. with respect to light having a wavelength of 550 nm.

In the present specification, an acid dissociation constant (pKa) represents a pKa in an aqueous solution, and is specifically a value determined by computation from a value based on a Hammett's substituent constant and database of publicly known literature values, using the following software package 1.

Software Package 1: Advanced Chemistry Development (ACD/Labs) Software V 8.14 for Solaris (1994-2007 ACD/Labs)

On the other hand, the pKa can also be determined by a molecular orbital computation method. Examples of a specific method therefor include a method for performing calculation by computing $H^+$ dissociation free energy in an aqueous solution based on a thermodynamic cycle. With regard to a computation method for $H^+$ dissociation free energy, the $H^+$ dissociation free energy can be computed by, for example, density functional theory (DFT), but various other methods have been reported in literature and the like, and are not limited thereto. There are a plurality of software applications capable of performing DFT, and examples thereof include Gaussian 16.

As described above, the pKa in the present specification refers to a value determined by computation from a value based on a Hammett's substituent constant and database of publicly known literature values, using the software package 1, but in a case where the pKa cannot be calculated by the method, a value obtained by Gaussian 16 based on density functional theory (DFT) shall be adopted.

In addition, the pKa in the present specification refers to a "pKa in an aqueous solution" as described above, but in a case where the pKa in an aqueous solution cannot be calculated, a "pKa in a dimethyl sulfoxide (DMSO) solution" shall be adopted.

<Cover Film>

The cover film according to the embodiment of the present invention is used for covering a test subject on a substrate.

In addition, the cover film according to the embodiment of the present invention includes a support and a polymer layer containing a polymer, in which a fracture toughness value of the polymer layer is 0.2 $MPa \cdot m^{0.5}$ or more, an in-plane retardation of the support at a wavelength of 590 nm is 1,000 nm or less, and the following requirement 1 and requirement 2 are satisfied.

Requirement 1: a dissolution rate of the polymer layer in xylene is 0.01 to 0.25 $g \cdot m^{-2} \cdot s^{-1}$.

Requirement 2: in a case where a viscosity of a xylene solution having a concentration of solid contents of 20%, which is obtained by dissolving the polymer layer in xylene, at 25° C. is defined as X, 1/X is 0.005 to 0.060 $cP^{-1}$.

The mechanism by which the cover film according to the embodiment of the present invention is less likely to generate chips during cutting, is less likely to generate voids during bonding to a substrate using an enclosing solution, and has excellent adhesiveness to the substrate is not always clear, but is presumed to be as follows by the present inventors.

It is considered that, since the cover film according to the embodiment of the present invention has a fracture toughness value of 0.2 $MPa \cdot m^{0.5}$ or more, the cover film can follow without being broken by deformation which may occur during the cutting, and the chips are less likely to be generated during the cutting of the cover film.

In addition, in order to prevent the generation of voids and to improve the adhesiveness to the substrate in a case where the cover film and the substrate are bonded to each other using an enclosing solution, it is considered that it is necessary to move the polymer to the voids and to ensure the adhesiveness by the polymer.

Here, in a case where the above-described dissolution rate is 0.25 $g \cdot m^{-2} \cdot s^{-1}$ or less, a permeation rate of the enclosing solution into the polymer layer is appropriate, and a time for the polymer to move into the voids from the polymer layer is secured. On the other hand, in a case where the above-described dissolution rate is 0.01 $g \cdot m^{-2} \cdot s^{-1}$ or more, a sufficient amount of the polymer is supplied between the cover film and the substrate to ensure the adhesiveness before the enclosing solution disappears due to drying or the like.

Furthermore, in a case where the 1/X is 0.060 $cP^{-1}$ or less, diffusibility of the polymer is excellent, and the polymer can move into the voids. On the other hand, in a case where the 1/X is 0.005 $cP^{-1}$ or more, it represents that the polymer itself has a predetermined molecular chain length, and the cover film and the substrate can be closely attached to each other by using such a polymer.

That is, it is considered that, by satisfying the above-described requirement 1 and requirement 2, it is possible to prevent the generation of voids in a case where the cover film and the substrate are bonded to each other using the enclosing solution, and to have excellent adhesiveness between the cover film and the substrate.

Hereinafter, the configuration and the like of the cover film will be described. The fracture toughness value, the requirement 1, and the requirement 2 will be described in detail later.

Hereinafter, the fact that the chips are less likely to be generated during cutting is referred to as "chip resistance", the fact that the voids are less likely to be generated in a case where the cover film and the substrate are bonded to each other using an enclosing solution is referred to as "void suppression property", and the fact that the cover film and the substrate have excellent adhesiveness to each other is also referred to as "adhesiveness".

[Support]

As the support included in the cover film, a transparent support is preferable from the viewpoint of microscopic properties. In the present specification, the "transparent"

means that a transmittance with respect to visible light (wavelength: 380 to 780 nm) is 60% or more. The transmittance refers to a proportion of transmitted light to incidence light into the support.

(Material of Support)

The transparent support is not particularly limited, and a transparent support can be used.

Among these, the transparent support is preferably a material in which a content of a specific ester compound described later is 1% by mass or less with respect to the total mass of the support.

Examples of the material constituting the support include cellulose-based polymers such as triacetyl cellulose (TAC), diacetyl cellulose, cellulose acetate propionate, and cellulose acetate butyrate; polyester-based polymers such as an aliphatic polyester; polyolefin-based polymers such as a cycloolefin polymer (COP), polyethylene, and polypropylene; an acrylic resin; a polycarbonate (PC); and polystyrene. Among these, a cellulose-based polymer, an acrylic resin, or a cycloolefin polymer (COP) is preferable, and triacetyl cellulose (TAC) is more preferable.

In a case where the material constituting the support is a polymer, a weight-average molecular weight (Mw) thereof is, for example, 10,000 to 1,000,000, preferably 30,000 to 300,000.

In the support, the above-described material may be used alone or in combination of two or more kinds thereof.

A content of the above-described material in the support is preferably more than 50% by mass and more preferably 80% by mass or more with respect to the total mass of the support. The upper limit value thereof is not particularly limited, and in a case where the support does not contain the specific ester compound, the upper limit value thereof may be 100% by mass or less with respect to the total mass of the support, and in a case where the support contains the specific ester compound, the upper limit value thereof may be a remainder.

(Specific Ester Compound)

In the support included in the cover film according to the embodiment of the present invention, it is preferable that the content of the specific ester compound is 1% by mass or less with respect to the total mass of the support.

That is, it is preferable that the support does not contain the specific ester compound, or in a case of containing the specific ester compound, the support contains the specific ester compound in a content of 1% by mass or less with respect to the total mass of the support.

The specific ester compound is a compound in which a pKa of at least one hydrolyzate, that is, compound having an oxo acid of an organic acid or an inorganic acid and a hydroxy group, among ester compounds obtained by a condensation reaction of an oxo acid of an organic acid or an inorganic acid and a hydroxy group-containing compound, is 2.5 or less.

In a case where the ester compound has a plurality of pKa's, it is sufficient that any one of the plurality of pKa's is 2.5 or less.

Examples of the specific ester compound include a phosphoric acid ester compound, a phosphorous acid ester compound, a sulfonic acid ester compound, and a nitric acid ester compound.

Examples of the hydrolyzate of the specific ester compound, having a pKa of 2.5 or less, include phosphoric acid produced by hydrolysis of a phosphoric acid ester compound, phosphorous acid produced by hydrolysis of a phosphorous acid ester compound, sulfonic acid such as methanesulfonic acid and benzenesulfonic acid, produced by hydrolysis of a sulfonic acid ester compound, and nitric acid produced by hydrolysis of a nitric acid ester compound.

Examples of the phosphoric acid ester compound include triphenyl phosphate, biphenyl diphenyl phosphate, bisphenol A bis-(diphenyl phosphate), trimethyl phosphate, triethyl phosphate, diphenyl-2-methacryloyl ethyl phosphate, tricresyl phosphate, trixylyl phosphate, and cresyl diphenyl phosphate.

Examples of the phosphorous acid ester compound include triphenyl phosphite, biphenyl diphenyl phosphite, bisphenol A bis-(diphenyl phosphite), trimethyl phosphite, triethyl phosphite, diphenyl-2-methacryloyl ethyl phosphite, tricresyl phosphite, trixylyl phosphite, and cresyl diphenyl phosphite.

Examples of the sulfonic acid ester compound include methyl benzenesulfonate, ethyl benzenesulfonate, methyl toluenesulfonate, and ethyl toluenesulfonate.

As the specific ester compound, the phosphoric acid ester compound is preferable, triphenyl phosphate, biphenyl diphenyl phosphate, or tricresyl phosphate is more preferable, and triphenyl phosphate or biphenyl diphenyl phosphate is still more preferable.

In a case where the support contains the specific ester compound, the specific ester compound may be used alone or in combination of two or more kinds thereof. In a case where two or more kinds of the specific ester compounds are present, it is preferable that the total content of the specific ester compounds is 1% by mass or less with respect to the total mass of the support.

The content of the specific ester compound in a case where the support contains the specific ester compound is preferably 0.6% by mass or less and more preferably 0.4% by mass or less with respect to the total mass of the support. It is particularly preferable that the support does not contain the specific ester compound.

The content of the specific ester compound contained in the support can be measured by the following measuring method.

For example, the type and content of each ester compound contained in the support are measured by a known measuring method such as a gas chromatography-mass spectrometry (GC/MS) method. From the structural formula of the ester compound, the pKa of a hydrolyzate produced by hydrolysis of each ester compound contained in the support is determined by calculation. In a case where a hydrolyzate having a pKa of 2.5 or less is present, the content of the ester compound generated from the hydrolyzate (in a case where two or more kinds of ester compounds are present, the total content thereof) is defined as the content of the specific ester compound. In a case where no hydrolyzate having a pKa of 2.5 or less is present, the support does not contain the specific ester compound.

(Second Ester Compound)

The support may contain a second ester compound other than the specific ester compound.

The second ester compound is not particularly limited as long as it is an ester compound in which the pKa of the hydrolyzate is all more than 2.5, and examples thereof include a carboxylic acid ester consisting of a carboxylic acid and a hydroxy group-containing compound.

Examples of the carboxylic acid ester compound include a sugar ester compound.

—Sugar Ester Compound—

The sugar ester compound is a compound in which hydrogen atoms in some or all of hydroxyl groups contained in saccharides are substituted with acyl groups.

Examples of the saccharides include monosaccharides, disaccharides, and polysaccharides, and disaccharides are preferable.

Examples of the monosaccharides include pentose such as ribose, deoxyribose, arabinose, and xylose; hexose such as glucose, galactose, and fructose; triose; tetrose; and heptose.

Examples of the disaccharides include sucrose, lactose, maltose, trehalose, turanose, and cellobiose, and sucrose is preferable.

Examples of the polysaccharides include glycogen and starch.

The saccharides may have any of a chain and a cyclic structure. Examples of the cyclic structure of the saccharides include a furanose ring and a pyranose ring.

Examples of the above-described acyl group include aliphatic acyl groups such as a formyl group, an acetyl group, a propionyl group, a 2-methylpropionyl group, a 2,2-dimethylpropionyl group, and a 2-ethylhexanoyl group; and aromatic acyl groups such as a benzoyl group, a 1-naphthylcarbonyl group, a 2-naphthylcarbonyl group, and a 2-furylcarbonyl group.

The number of carbon atoms in the above-described acyl group is preferably 1 to 10.

As the sugar ester compound, sugar ester compounds represented by General Formulae (I) to (III) are also preferable.

$$(HO)m\text{-}G\text{-}(L\text{-}R^1)n \qquad (I)$$

$$(HO)p\text{-}G\text{-}(L\text{-}R^1)q \qquad (II)$$

$$(HO)t\text{-}G'\text{-}(L'\text{-}R^2)r \qquad (III)$$

(in General Formulae (I) to (III), G and G' each independently represent a monosaccharide residue or a disaccharide residue; $R^1$'s each independently represent an aliphatic group or an aromatic group, where at least one of $R^1$'s represents an aromatic group; $R^2$'s each independently represent an aliphatic group; L and L' each independently represent a divalent linking group; and m represents an integer of 0 or more, n, p, and q each independently represent an integer of 1 or more, r represents an integer of 3 or more, and t represents an integer of 0 or more; provided that $m+n\geq4$, $p+q\geq4$, $m>p$, and $n<q$; in addition, m+n and p+q are each equal to the number of hydroxyl groups in a case where it is assumed that G is, instead of a residue, a cyclic acetal structure having the same skeleton as unsubstituted saccharides, and r+t is equal to the number of hydroxyl groups in a case where it is assumed that G' is, instead of a residue, a cyclic acetal structure having the same skeleton as unsubstituted saccharides)

As the sugar ester compound, it is more preferable to use a sugar ester compound mixture obtained by mixing an aromatic sugar ester compound represented by General Formula (I) described above, an ester compound which is represented by General (II) described above and is different from the aromatic sugar ester compound represented by General Formula (I) described above, and an aliphatic sugar ester compound represented by General Formula (III) described above.

Hereinafter, preferred ranges common to each of the sugar ester compounds and preferred ranges specific to each of the sugar ester compounds satisfying General Formulae (I) to (III) will be described.

Each of the sugar ester compounds used in the above-described sugar ester compound mixture has a monosaccharide residue or a disaccharide residue as a skeleton. That is, in General Formulae (I) to (III) described above, G and G' each independently represent a monosaccharide residue or a disaccharide residue.

The above-described sugar ester compound refers to a compound in which at least one substitutable group (for example, a hydroxyl group and a carboxyl group) in a sugar skeleton structure of the compound is ester-bonded with at least one substituent. That is, the sugar ester compound mentioned herein includes broad-sense sugar derivatives, and also includes compounds containing a sugar residue as a structure, such as a gluconic acid. That is, the above-described sugar ester compound includes an ester of glucose and a carboxylic acid and an ester of a gluconic acid and an alcohol.

The above-described sugar ester compound preferably has a furanose structure or a pyranose structure. In a case of having a furanose structure or a pyranose structure as a sugar skeleton, it is required that, General Formulae (I) to (III) described above, the conditions that $m+n\geq4$, $p+q\geq4$, and r is 3 or more are satisfied.

In addition, in a case of having a furanose structure or a pyranose structure as a sugar skeleton, it is required that the conditions that m+n and p+q are each equal to the number of hydroxyl groups in a case where it is assumed that G is, instead of a residue, a cyclic acetal structure having the same skeleton as unsubstituted saccharides, and r+t is equal to the number of hydroxyl groups in a case where it is assumed that G' is, instead of a residue, a cyclic acetal structure having the same skeleton as unsubstituted saccharides are also satisfied.

The upper limit values of m+n, p+q, and r+t can adopt values determined by the type of G or G' described above, and are 5 in a case where G or G' is a monosaccharide residue and 8 in a case where G or G' is a disaccharide residue.

As the sugar ester compounds represented by General Formulae (I) to (III) described above, an esterified compound obtained by esterifying all or some of OH groups in a compound (A) having one of a furanose structure or a pyranose structure, in which G or G' described above is a monosaccharide residue, or an esterified compound obtained by esterifying all or some of OH groups in a compound (B) having two of at least one of a furanose structure or a pyranose structure bonded to each other, in which G or G' described above is a disaccharide residue is preferable.

Examples of the compound (A) include glucose, galactose, mannose, fructose, xylose, and arabinose, but the compound (A) is not limited thereto.

Examples of the compound (B) include lactose, sucrose, nystose, 1F-fructosylnystose, stachyose, maltitol, lactitol, lactulose, cellobiose, maltose, cellotriose, maltotriose, raffinose, and kestose. In addition, examples thereof also include gentiobiose, gentiotriose, gentiotetraose, xylotriose, and galactosyl sucrose, but the compound (B) is not limited thereto.

Among these compound (A) and compound (B), a compound having both the furanose structure and the pyranose structure is preferable. For example, sucrose, kestose, nystose, 1F-fructosylnystose, or stachyose is preferable, and sucrose is more preferable. In addition, in the compound (B), a compound in which two of at least one of the furanose structure or the pyranose structure are bonded to each other is also a preferred aspect.

The substituent used for esterifying all or some of the OH groups in the compound (A) and the compound (B) is not particularly limited. Among these, it is preferable to use a monocarboxylic acid. That is, it is preferable that $R^1$ in General Formula (I) and General Formula (II) described above and $R^2$ in General Formula (III) described above each independently represent an acyl group.

The above-described monocarboxylic acid is not particularly limited, and known aliphatic monocarboxylic acids, alicyclic monocarboxylic acids, aromatic monocarboxylic acids, and the like can be used. One kind of carboxylic acid may be used, or a mixture of two or more kinds thereof may be used. In a case of a plurality of $R^1$'s or a plurality of $R^2$'s, the plurality of $R^1$'s or the plurality of $R^2$'s may be the same or different from each other.

On the other hand, it is preferable that L in General Formula (I) and General Formula (II) described above and L' in General Formula (III) described above each independently represent a single bond, —O—, —CO—, or —$NR^{11}$— ($R^{11}$ represents a monovalent substituent), and in a case of a plurality of L's or a plurality of L's, they may be the same or different from each other. Among these, from the viewpoint that the above-described L or L' can be easily substituted with an acyl group as $R^1$ and $R^2$, it is preferable that L or L' represents —O—.

Next, preferred aspects of the aromatic sugar ester compound represented by each of General Formulae (I) and (II) will be described.

In General Formulae (I) and (II), $R^1$'s each independently represent an aliphatic group or an aromatic group, where at least one of $R^1$'s represents an aromatic group. Among these, it is preferable that $R^1$'s each independently represent only an aromatic group and more preferable that $R^1$'s each independently represent the same aromatic group.

In addition, in General Formulae (I) and (II), m represents an integer of 0 or more, and n, p, and q each independently represent an integer of 1 or more, where $m>p$ and $n<q$.

In the aromatic sugar ester compound represented by General Formula (I) and the aromatic sugar ester compound represented by General Formula (II), in a case where G is a disaccharide residue, n is preferably 3 or more and more preferably 5 or more.

Examples of the aromatic monocarboxylic acid preferably used in a case of being substituted with $R^1$ include aromatic monocarboxylic acids such as a benzoic acid and a toluic acid, in which an alkyl group or an alkoxy group is introduced to a benzene ring of a benzoic acid; aromatic monocarboxylic acids such as a cinnamic acid, a benzilic acid, a biphenylcarboxylic acid, a naphthalenecarboxylic acid, and a tetralincarboxylic acid, which have two or more benzene rings; and derivatives thereof.

Next, preferred aspects of the aliphatic sugar ester compound represented by General Formula (III) will be described. In General Formula (III), $R^2$'s each independently represent an aliphatic group.

Examples of the aliphatic monocarboxylic acid preferably used in a case of being substituted with $R^2$ include saturated fatty acids such as an acetic acid, a propionic acid, a butyric acid, an isobutyric acid, a valeric acid, a caproic acid, an enanthic acid, a caprylic acid, a pelargonic acid, a capric acid, a 2-ethyl-hexanecarboxylic acid, an undecylic acid, a lauric acid, a tridecylic acid, a myristic acid, a pentadecylic acid, a palmitic acid, a heptadecylic acid, a stearic acid, a nonadecanoic acid, an arachic acid, a behenic acid, a lignoceric acid, a cerotic acid, a heptacosanoic acid, a montanoic acid, a melissic acid, and a lacceric acid; and unsaturated fatty acids such as an undecylenic acid, an oleic acid, a sorbic acid, a linoleic acid, a linolenic acid, an arachidonic acid, and an octenoic acid.

Preferred examples of the alicyclic monocarboxylic acid include cyclopentanecarboxylic acid, cyclohexanecarboxylic acid, cyclooctanecarboxylic acid, and a derivative thereof.

It is preferable that $R^2$'s each independently represent a non-cyclic aliphatic group, and it is more preferable that all $R^2$'s represent a non-cyclic aliphatic group.

It is preferable that $R^2$ represents two or more kinds of aliphatic groups.

Among the aliphatic monocarboxylic acids, the aliphatic sugar ester compound represented by General Formula (III) is preferably substituted with at least acetic acid. That is, it is preferable that at least one of $R^2$'s in General Formula (III) represents an acetyl group.

On the other hand, it is more preferable that at least one of $R^2$'s represents a branched aliphatic group, and it is particularly preferable that, in a case where $R^2$'s represent two or more kinds of aliphatic groups, only one of the aliphatic groups is a branched aliphatic group. Among these, it is preferable that the aliphatic sugar ester compound represented by General Formula (III) is substituted with isobutyric acid in addition to the acetic acid. That is, it is preferable that $R^2$ in General Formula (III) includes an acetyl group and an isobutyl group.

From the viewpoint of improving planar failure of the obtained cellulose ester film, it is preferable that G' in General Formula (III) represents a disaccharide residue.

A method of producing these aliphatic sugar ester compounds substituted with the aliphatic monocarboxylic acid is described in, for example, JP1996-245678A (JP-H8-245678A).

In a case where a combination of the sugar ester compounds represented by General Formulae (I) to (III) is used as the sugar ester compound, a mixing proportion thereof is not particularly limited, but the total content of the aromatic sugar ester compounds/content of the aliphatic ester compound (mass ratio) is preferably more than 1, more preferably 2 to 10, and still more preferably 3 to 5.

In addition, in a case where a combination of the sugar ester compounds represented by General Formulae (I) to (III) is used as the sugar ester compound, the total content of the sugar ester compounds represented by General Formulae (I) to (III) is preferably 1% to 30% by mass, more preferably 5% to 30% by mass, still more preferably 5% to 20% by mass, and particularly preferably 5% to 15% by mass with respect to cellulose ester.

With regard to the sugar ester compounds represented by General Formulae (I) to (III), reference can also be made to the description in paragraphs to of JP2012-031313A, the description of which is incorporated herein by reference.

(Properties of Support)

—Thickness—

The thickness of the support is not particularly limited, but is preferably in a range of 50 to 250 μm, more preferably in a range of 50 to 150 μm, and still more preferably in a range of 100 to 150 μm.

—Refractive Index—

A refractive index of the support is not particularly limited, and may be, for example, 1.440 to 1.600. From the viewpoint of microscopic properties, the refractive index of the support is preferably 1.460 to 1.560 that is close to that of the glass slide (refractive index: 1.52 to 1.56).

—Retardation—

The in-plane retardation of the support is 1,000 nm or less. From the viewpoint of being suitable for observation with a polarization microscope, the in-plane retardation of the support is preferably 600 nm or less, more preferably 400 nm, and still more preferably 200 nm or less. The lower limit of the in-plane retardation is 0 nm.

From the viewpoint of being suitable for observation with a polarization microscope, a thickness direction retardation of the support is preferably −300 to 300 nm, more preferably −100 to 100 nm, and still more preferably −50 to 50 nm.

In the present specification, an in-plane retardation Re(λ) at a wavelength λ and a thickness direction retardation Rth(λ) at a wavelength λ refer to values measured by the following methods, respectively. In addition, in a case where a wavelength is not particularly described, λ is 590 nm.

Re(λ) and Rth(λ) can be calculated from measured values of an average refractive index ((nx+ny+nz)/3) and a film thickness (d (μm)) measured at a wavelength λ using a retardation measuring device (KOBRA-21WR, manufactured by Oji Scientific Instruments).

On the surface of the support, an undercoat layer which is known in the field of photosensitive materials may be provided. A surface treatment such as ultraviolet irradiation, corona discharge, or glow discharge may be performed on the support.

[Polymer Layer]

The polymer layer of the cover film contains a polymer, has a fracture toughness value of 0.2 MPa·$m^{0.5}$ or more, and satisfies a requirement 1 and a requirement 2.

Hereinafter, the polymer and optional components contained in the polymer layer will be described, and then the requirements satisfied by the polymer layer will be described.

(Polymer)

The polymer contained in the polymer layer is not particularly limited as long as the fracture toughness value of the polymer layer is 0.2 MPa·$m^{0.5}$ or more and the requirement 1 and requirement 2 are satisfied.

The polymer contained in the polymer layer is preferably a polymer which is swollen in an organic solvent used as an enclosing solution in an automatic enclosing device, and more preferably a polymer which is dissolved in the organic solvent. Examples of the organic solvent used in the automatic enclosing device include any single solvent of xylene, toluene, mesitylene (1,3,5-trimethylbenzene), pseudocumene (1,2,4-trimethylbenzene), hemimellitene (1,2,3-trimethylbenzene), durene (1,2,4,5-tetramethylbenzene), anisole, ethyl propionate, amyl acetate, propyl acetate, isopropyl acetate, butyl acetate, methyl lactate, dimethyl carbonate, 1-butanol, 1-propanol, 2-butanol, 1-pentanol, 2-pentanol, isoamyl alcohol, t-amyl alcohol, neopentyl alcohol, cyclopentanol, 2-hexanol, 4-methyl-2-pentanol, methyl isobutyl ketone, acetylacetone, cyclopentanone, n-butyl ether, 1,2-dimethoxyethane, dioxane, cyclopentyl methyl ether, 1-methoxy-2-propanol, 2-methoxy-1-methylethyl acetate, ethyl acetate, methyl acetate, acetone, and methyl ethyl ketone, and a mixed solvent of two or more thereof. In a case where the polymer is swollen in the organic solvent or is dissolved in the organic solvent, the cover film and the substrate are bonded to each other, and the test subject can be enclosed.

From the viewpoint of excellent solubility in the above-described organic solvent, the polymer is preferably an acrylic resin.

In the present specification, the acrylic resin refers to a polymer which has a repeating unit derived from an acrylate monomer and/or a methacrylate monomer.

The acrylic resin is not particularly limited as long as it has the repeating unit derived from an acrylate monomer and/or a methacrylate monomer, and may be a homopolymer including a repeating unit derived from one monomer selected from the group consisting of an acrylate monomer and a methacrylate monomer or may be a polymer (copolymer) including at least two or more repeating units selected from the group consisting of an acrylate monomer and a methacrylate monomer.

In addition, the acrylic resin may be a copolymer including a repeating unit derived from at least one monomer selected from the group consisting of an acrylate monomer and a methacrylate monomer and at least one monomer other than the acrylate monomer and the methacrylate monomer (for example, acrylamide monomers such as dimethylacrylamide and isopropylacrylamide, and vinyl monomers such as styrene).

In the acrylic resin, a content of the repeating unit derived from an acrylate monomer and/or a methacrylate monomer is preferably 50% by mass or more, more preferably 70% by mass or more, and still more preferably 90% by mass or more with respect to all repeating units of the acrylic resin. The upper limit of the content of the repeating unit derived from an acrylate monomer and/or a methacrylate monomer is not particularly limited, and may be 100% by mass with respect to all repeating units of the acrylic resin.

It is particularly preferable that the acrylic resin includes only the repeating unit derived from an acrylate monomer and/or a methacrylate monomer.

The acrylic resin can be prepared by a known method, and can be prepared, for example, by polymerizing at least one monomer selected from the group consisting of an acrylate monomer and a methacrylate monomer.

Examples of the acrylate monomer and the methacrylate monomer described above include an alkyl acrylate and an alkyl methacrylate.

The alkyl group in the alkyl acrylate and the alkyl methacrylate may be linear or branched.

In addition, the above-described alkyl group may further have a substituent.

Examples of the above-described substituent include an aryl group and a hydroxy group, and an aryl group is preferable and a phenyl group is more preferable. The number of carbon atoms in the alkyl group in the alkyl acrylate and the alkyl methacrylate, which may have a substituent, is preferably 1 to 15, more preferably 1 to 8, still more preferably 1 to 5, and particularly preferably 1 to 3.

Some of methylene groups constituting the above-described alkyl group may be substituted with a divalent substituent. Examples of the above-described divalent substituent include —O— and —CO—.

Specific examples of the above-described acrylate monomer include methyl acrylate, ethyl acrylate, n-propyl acrylate, i-propyl acrylate, n-butyl acrylate, i-butyl acrylate, t-butyl acrylate, 2-ethylhexyl acrylate, cyclohexyl acrylate, lauryl acrylate, phenyl acrylate, benzyl acrylate, 2-methoxyethyl methacrylate, hydroxyethyl acrylate, and acetoacetoxyalkyl acrylate.

Specific examples of the above-described methacrylate monomer include methyl methacrylate, ethyl methacrylate, n-propyl methacrylate, i-propyl methacrylate, n-butyl methacrylate, i-butyl methacrylate, t-butyl methacrylate, 2-ethylhexyl methacrylate, cyclohexyl methacrylate, phenyl methacrylate, benzyl methacrylate, lauryl methacrylate, 2-methoxyethyl methacrylate, hydroxyethyl methacrylate, and 2-acetoacetoxyethyl methacrylate.

Among these, the polymer preferably includes a repeating unit derived from at least one monomer selected from the group consisting of ethyl acrylate, n-butyl acrylate, methyl methacrylate, ethyl methacrylate, n-butyl methacrylate, i-butyl methacrylate, t-butyl methacrylate, 2-ethylhexyl methacrylate, cyclohexyl methacrylate, benzyl methacrylate, lauryl methacrylate, 2-methoxyethyl methacrylate, 2-acetoacetoxyethyl methacrylate, phenyl acrylate, phenyl methacrylate, styrene, and dimethylacrylamide; and more preferably includes a repeating unit derived from at least one monomer selected from the group consisting of ethyl acrylate, methyl methacrylate, ethyl methacrylate, n-butyl methacrylate, i-butyl methacrylate, t-butyl methacrylate, 2-ethylhexyl methacrylate, benzyl methacrylate, lauryl methacrylate, and 2-methoxyethyl methacrylate.

As one suitable aspect of the polymer constituting the polymer layer, a polymer X including a repeating unit derived from alkyl acrylate and a repeating unit derived from alkyl methacrylate is preferable.

As the repeating unit derived from alkyl acrylate, included in the polymer X, a repeating unit derived from alkyl acrylate having an alkyl group having 1 to 7 carbon atoms (preferably having 1 to 5 carbon atoms and more preferably having 1 to 3 carbon atoms) is preferable, and a repeating unit derived from ethyl acrylate is more preferable from the viewpoint of the fracture toughness value.

In the polymer X, a content of the repeating unit derived from alkyl acrylate is preferably 5% to 40% by mass and more preferably 20% to 30% by mass with respect to all repeating units of the polymer X.

As the repeating unit derived from alkyl methacrylate, included in the polymer X, a repeating unit derived from alkyl methacrylate having an alkyl group having 1 to 15 carbon atoms (preferably having 1 to 5 carbon atoms and more preferably having 1 to 3 carbon atoms) is preferable.

Examples of the alkyl methacrylate constituting the repeating unit derived from alkyl methacrylate include methyl methacrylate, ethyl methacrylate, 2-methoxyethyl methacrylate, n-butyl methacrylate, i-butyl methacrylate, t-butyl methacrylate, benzyl acrylate, 2-ethylhexyl methacrylate, and lauryl methacrylate. Among these, from the viewpoint of the dissolution rate and the fracture toughness value, the polymer X preferably includes a repeating unit derived from ethyl methacrylate, t-butyl methacrylate, or benzyl acrylate, and more preferably includes a repeating unit derived from ethyl methacrylate.

In the polymer X, the repeating unit derived from alkyl methacrylate may be only one kind or two or more kinds.

In the polymer X, a content of the repeating unit derived from alkyl methacrylate is preferably 60% to 95% by mass and more preferably 70% to 90% by mass with respect to all repeating units of the polymer X.

As a suitable aspect of the polymer X, a polymer Y including a repeating unit derived from ethyl acrylate, a repeating unit derived from methyl methacrylate, and a repeating unit derived from an alkyl methacrylate other than methyl methacrylate is preferable. As described above, examples of the other alkyl methacrylates include ethyl methacrylate.

In the polymer Y, a content of the repeating unit derived from ethyl acrylate is preferably 5% to 40% by mass, more preferably 10% to 30% by mass, and still more preferably 15% to 25% by mass with respect to all repeating units of the polymer Y.

In the polymer Y, a content of the repeating unit derived from methyl methacrylate is preferably 20% to 80% by mass and more preferably 50% to 70% by mass with respect to all repeating units of the polymer Y.

In addition, in the polymer Y, a content of the repeating unit derived from an alkyl methacrylate other than methyl methacrylate (preferably, ethyl methacrylate) is preferably 5% to 50% by mass, more preferably 10% to 40% by mass, and still more preferably 15% to 25% by mass with respect to all repeating units of the polymer Y.

A weight-average molecular weight (Mw) of the polymer is preferably 10,000 to 500,000, more preferably 50,000 to 140,000, and still more preferably 80,000 to 120,000.

In the present specification, a weight-average molecular weight (Mw) is a molecular weight in terms of polystyrene used as a standard substance, which is detected by using a solvent tetrahydrofuran (THF), a differential refractometer, and a gel permeation chromatography (GPC) analyzer using TSKgel GMHxL, TSKgel G4000HxL, TSKgel G2000HxL, and/or TSKgel Super HZM-N(all trade names manufactured by Tosoh Corporation) as columns, unless otherwise specified.

In a case where the cover film according to the embodiment of the present invention is used as a cover film of a dyed specimen, a dyeing coloring agent may spread in the polymer layer, which may deteriorate observability. In order to prevent this aspect, it is also preferable to reduce compatibility of the polymer with the coloring agent for dyeing.

The compatibility between the polymer and the coloring agent for dyeing (for example, eosin) can be determined from a Hansen solubility parameter distance, and for example, the Hansen solubility parameter distance between the polymer and the coloring agent for dyeing is preferably 12.00 $MPa^{0.5}$ or more, more preferably 12.50 $MPa^{0.5}$ or more, and still more preferably 13.00 $MPa^{0.5}$ or more. The upper limit of the Hansen solubility parameter distance is not limited, and for example, the Hansen solubility parameter distance is 40.00 $MPa^{0.5}$ or less.

A content of the polymer in the polymer layer is not particularly limited, but is preferably 85% by mass or more and more preferably 90% by mass or more with respect to the total mass of the polymer layer. The upper limit thereof may be 100% by mass or less, and is preferably 99.99% by mass or less and more preferably 99.95% by mass or less.

The polymer may be used singly or in combination of two or more kinds thereof. In a case where two or more kinds of polymers are used, it is preferable that the two or more kinds of polymers are used at a ratio at which turbidity does not occur in a dried film obtained by mixing the two or more kinds of polymers.

(Silane Coupling Agents)

The polymer layer may contain at least one selected from the group consisting of a silane coupling agent, a hydrolyzate thereof, and a hydrolysis condensate thereof (hereinafter, these are also collectively referred to as "silane coupling agents").

From the viewpoint that blocking is less likely to occur between the polymer layer and a back surface of the support (surface of the support on a side opposite to the surface on which the polymer layer is formed) even in a case where the cover film according to the embodiment of the present invention is stored in a roll shape, and that storability for a long period of time is more excellent, it is preferable that the polymer layer contains the silane coupling agents.

The type of the silane coupling agent is not particularly limited, but a silane coupling agent which has two or more different reactive groups in a molecule, in which at least one of the reactive groups is a reactive group which is chemically bonded to an inorganic substance and at least one of the reactive groups is a reactive group which is chemically bonded to an organic material, is preferable.

Examples of the silane coupling agent include a silane coupling agent represented by the following general formula.

$$X—Si(R^1)_3$$

X represents a group having a reactive group. Examples of the reactive group include a vinyl group, an epoxy group, an amino group, a (meth)acryloyl group, and a mercapto group. More specifically, X can be a group represented by $R^2$-L-. $R^2$ represents a reactive group, and L represents a divalent linking group (preferably, an alkylene group which may include a heteroatom (for example, an oxygen atom)).

$R^1$ represents a hydrolyzable group. The hydrolyzable group is a group which is directly linked to a silicon atom (Si) and can cause a hydrolysis reaction and/or a condensation reaction. Examples of the hydrolyzable group include an alkoxy group, a halogen atom, an acyloxy group, an alkenyloxy group, and an isocyanate group.

As the silane coupling agent, for example, one or more selected from the group consisting of vinyltrichlorosilane, vinyltris(β-methoxyethoxy)silane, vinyltriethoxysilane, vinyl trimethoxysilane, γ-(methacryloxypropyl)trimethoxy silane, β-(3,4-epoxycyclohexyl)ethyltrimethoxysilane, γ-glycidoxypropyltrimethoxysilane, γ-glycidoxypropylmethyldiethoxysilane, N-β-(aminoethyl)-γ-aminopropyltrimethoxysilane, N-β-(aminoethyl)-γ-aminopropyl methyldimethoxysilane, γ-aminopropyl triethoxysilane, N-phenyl-γ-aminopropyltrimethoxysilane, γ-mercaptopropyl trimethoxysilane, and γ-chloropropyl trimethoxysilane are preferable; one or more selected from the group consisting of γ-glycidoxypropyltrimethoxysilane, N-β-(aminoethyl)-γ-aminopropyltrimethoxysilane, and γ-aminopropyl triethoxysilane are more preferable; one or more selected from the group consisting of γ-glycidoxypropyltrimethoxysilane and N-β-(aminoethyl)-γ-aminopropyltrimethoxysilane are still more preferable; and γ-glycidoxypropyltrimethoxysilane is particularly preferable.

The hydrolyzate of the silane coupling agent is intended to be a compound obtained by hydrolyzing the hydrolyzable group in the silane coupling agent. The above-described hydrolyzate may be a compound in which all of the hydrolyzable groups are hydrolyzed (completely hydrolyzed product) or a compound in which some of the hydrolyzable groups are hydrolyzed (partially hydrolyzed product). That is, the above-described hydrolyzate may be the completely hydrolyzed product, the partially hydrolyzed product, or a mixture thereof.

In addition, the hydrolysis condensate of the silane coupling agent is intended to be a compound obtained by hydrolyzing the hydrolyzable group in the silane coupling agent and condensing the obtained hydrolyzate. The above-described hydrolysis condensate may be a compound in which all of the hydrolyzable groups are hydrolyzed and all of the hydrolyzates are condensed (completely hydrolyzed and condensed product) or a compound in which some of the hydrolyzable groups are hydrolyzed and some of the hydrolyzates are condensed (partially hydrolyzed and condensed product). That is, the above-described hydrolysis condensate may be the completely hydrolyzed and condensed product, the partially hydrolyzed and condensed product, or a mixture thereof.

It can be easily understood by those skilled in the art that the type of the silane coupling agents used in the polymer layer is selected depending on the type of an organic material to be bonded to glass, that is, the type of the polymer constituting the polymer layer.

A content of the silane coupling agents in the polymer layer is preferably 0.1 $mg/m^2$ or more and more preferably 5 to 25 $mg/m^2$ with respect to the area of the polymer layer.

The silane coupling agents may be used alone or in combination of two or more kinds thereof.

The silane coupling agents in the polymer layer may be homogeneously present in the entire polymer layer, or may be unevenly distributed on any surface of the polymer layer. In a case where the silane coupling agents are unevenly distributed on any surface of the polymer layer, the surface may be a surface of the polymer layer on a side facing the support or may be a surface of the polymer layer on a side opposite to the support.

(Plasticizer)

The polymer layer of the present invention may contain a plasticizer.

In a case of containing a plasticizer, compatibility of the polymer layer with a solvent (xylene or the like) can be assisted, a dissolution rate in a case where the polymer layer is in contact with the solvent can be increased, and brittleness of the polymer layer can be improved.

The type of the plasticizer is not particularly limited, but a plasticizer having high compatibility with the polymer to be used is preferable. For example, it is preferable that a Hansen solubility parameter distance between the plasticizer and the polymer is small.

As the plasticizer, for example, plasticizers selected from the group consisting of phosphates such as triphenyl phosphate, bisphenol A bis-(diphenyl phosphate), trimethyl phosphate, triethyl phosphate, and diphenyl-2-methacryloylethyl phosphate; adipic acid esters such as dioctyl adipate, dibutyl adipate, diisobutyl adipate, ADK CIZER LV-808 (manufactured by ADEKA CORPORATION), and POLYCIZER W-242, W-230-H, W-1020-EL, and W-1430-EL; sebacic acid esters such as dioctyl sebacate; tris(2-ethylhexyl) trimellitate; dibutyl maleate; and glycerin triacetate are preferable.

In addition, preferred examples of the plasticizer also include phthalic acid esters such as diisononyl phthalate, bis(2-ethylhexyl) phthalate, and isodecyl phthalate; trimellitic acid esters such as ADK CIZER C series (for example, C-8 and the like; manufactured by ADEKA CORPORATION) and MONOCIZER W-705 (manufactured by DIC Corporation); pyromellitic acid esters such as ADK CIZER UL-80 and UL-100 (manufactured by ADEKA CORPORATION); dipentaerythritol esters such as ADK CIZER UL-8 (manufactured by ADEKA CORPORATION); carboxylic acid esters having an epoxy group, such as MONOCIZER W-150 (manufactured by DIC Corporation); and benzoic acid esters such as MONOCIZER PB-3A (manufactured by DIC Corporation).

In addition, preferred examples of the plasticizer also include glycol compounds such as polyethylene glycol, triethylene glycol bis(2-ethylhexanoate), and diethylene glycol dibenzoate.

The plasticizer may be a deep eutectic solvent (DES). The deep eutectic solvent is a solvent containing a hydrogen bond acceptor compound and a hydrogen bond donor compound, and is a solvent in which an eutectic melting point is lowered and a melting point is significantly lowered by mixing the hydrogen bond acceptor compound and the hydrogen bond donor compound.

Examples of the hydrogen bond acceptor compound include a quaternary ammonium compound, a phosphorus compound, a metal salt, an amino acid, and a polyvalent carboxylic acid, and examples of the hydrogen bond donor compound include an alcohol compound, saccharides, a carboxylic acid, and an amine compound.

Examples of the deep eutectic solvent include solvents described in US2018/0194913A and 0025 to 0048 of JP2020-105336A.

(Thickener)

The polymer layer may contain a thickener.

The type of the thickener is not particularly limited, and examples thereof include polysaccharides, celluloses, polymer compounds such as acrylic, polyvinyl alcohol, diol, and terpene, inorganic particles such as silica particles and titania particles, and organic particles consisting of a polymer such as PMMA, and cellulose acetate (more preferably cellulose acetate butyrate or cellulose acetate phthalate) or silica particles are preferable.

From the viewpoint of suppressing bleed out (migration) of a hydrophilic material from a member in contact with the polymer layer, it is preferable that a surface of the inorganic particles is treated to be hydrophobic.

Sizes of the inorganic particles and the organic particles are not particularly limited, but in a case where the sizes are excessively large, scattering is likely to occur and microscopic properties may be deteriorated, so that average secondary particle diameters of the inorganic particles and the organic particles (average particle diameter of aggregates of the inorganic particles and the organic particles) are preferably 1 μm or less. The lower limit value thereof is not particularly limited, and may be 1 nm or more. The average secondary particle diameters of the inorganic particles and the organic particles can be measured based on a dynamic light scattering method using a particle diameter measuring device ("nanoSAQLA" manufactured by Otsuka Electronics Co., Ltd.).

In addition, from the viewpoint of preventing the scattering, it is preferable that refractive indices of the inorganic particles and the organic particles are close to the refractive index of the polymer layer. More specifically, the refractive indices of the inorganic particles and the organic particles are preferably 1.40 to 1.60.

In a case where the polymer layer contains the above-described thickener and/or plasticizer, a content of each additive is not particularly limited, and from the viewpoint of further exhibiting the effect of each additive, it is preferably 0.5% by mass or more, more preferably 1% by mass or more, and still more preferably 3% by mass or more with respect to the total mass of the polymer layer. Among these, from the viewpoint of further suppressing chips during cutting, it is particularly preferable that the content of the thickener selected from the group consisting of the inorganic particles and the organic particles in the polymer layer is within the above-described range.

The upper limit of the content of the above-described additive is not particularly limited, but from the viewpoint of adhesiveness of the polymer layer, it is preferably 20% by mass or less, more preferably 15% by mass or less, and still more preferably 10% by mass or less with respect to the total mass of the polymer.

(Properties of Polymer Layer)

—Fracture Toughness Value—

The fracture toughness value of the polymer layer is 0.2 $MPa\cdot m^{0.5}$ or more.

From the viewpoint of chip resistance, the fracture toughness value of the polymer layer is more preferably 1.0 $MPa\cdot m^{0.5}$ or more. The upper limit of the fracture toughness value of the polymer layer is not particularly limited, but is 5.0 $MPa\cdot m^{0.5}$ or less in many cases.

A method of measuring the fracture toughness value of the polymer layer is as follows.

The fracture toughness value of the polymer layer is measured by an indenter penetration method (IF method). More specifically, a cube corner protrusion is pressed into the polymer layer with a load of 20 mN using a nanoindenter (iNano, G200 manufactured by Toyo Corporation), and the fracture toughness value ($K_{IC}$, unit: $MPa\cdot m^{0.5}$) is calculated from a length of a crack generated in the corner of the indentation.

$$K_{IC}=\alpha(E/H)^{0.5}\cdot(P/C^{1.5})$$

In the above expression, α is a constant of 0.032, E is a Young's modulus, His a Vickers hardness, P is an indentation load, and C is a crack length.

The fracture toughness value of the polymer layer can be controlled by adjusting the kind of the repeating unit in the polymer contained in the polymer layer, the weight-average molecular weight, and the like.

—Requirement 1—

The requirement 1 regarding the above-described polymer layer is as follows.

Requirement 1: a dissolution rate of the polymer layer in xylene is 0.01 to 0.25 $g\cdot m^{-2}\cdot s^{-1}$.

The above-described dissolution rate ($g\cdot m^{-2}\cdot s^{-1}$) is measured by the following procedure.

A cover film including the support and the polymer layer containing the polymer is cut to have a predetermined size (24 mm in length×120 mm in width) to obtain a sample for measurement, and the mass (mass before immersion) thereof is measured. The above-described sample for measurement is immersed in xylene (1200 mL) placed in a container for a certain period of time. After the immersion, the cover film is gently taken out from the container, and the xylene is sufficiently dried. The mass after drying (mass after immersion) thereof is measured, and a difference between the mass before immersion and the mass after immersion is calculated. The dissolution rate ($g\cdot m^{-2}\cdot s^{-1}$) is calculated by dividing the mass difference by the area ($m^2$) and the immersion time (s) of the sample for measurement.

The immersion time may be appropriately set such that the polymer layer is not completely dissolved, and it is preferably 30 seconds to 300 seconds, and examples thereof include 60 seconds. The temperature and time in a case of drying the xylene may be appropriately set, and examples thereof include 60 minutes at 150° C.

From the viewpoint of further improving the void suppression property and the adhesiveness, the above-described dissolution rate is preferably 0.03 to 0.25 $g\cdot m^{-2}\cdot s^{-1}$, more preferably 0.05 to 0.20 g $m^{-2}\cdot s^{-1}$, and still more preferably 0.05 to 0.15 $g\cdot m^{-2}\cdot s^{-1}$.

The dissolution rate of the polymer layer can be controlled by adjusting the kind of the repeating unit in the polymer contained in the polymer layer, the weight-average molecular weight, and the like.

—Requirement 2—

The requirement 2 regarding the above-described polymer layer is as follows.

Requirement 2: in a case where a viscosity of a xylene solution having a concentration of solid contents of 20%, which is obtained by dissolving the polymer layer in xylene, at 25° C. is defined as X, 1/X is 0.005 to 0.060 $cP^{-1}$.

The 1/X ($cP^{-1}$) is measured by the following procedure.

The polymer layer is peeled off from the cover film including the support and the polymer layer containing the polymer, and the mass of the obtained polymer layer is measured. The obtained polymer layer is dissolved in xylene to prepare a xylene solution having a concentration of solid contents of 20%. That is, the xylene solution contains a predetermined amount of components constituting the polymer layer as solid contents.

A viscosity X (cP) of the above-described xylene solution is measured with an E-type viscometer (VISCOMETER RE-85L, manufactured by Toki Sangyo Co., Ltd.). The measurement temperature is set to 25° C. The reciprocal of the measured viscosity X (cP) is taken to calculate the 1/X ($cP^{-1}$).

From the viewpoint of further improving the void suppression property and the adhesiveness, the 1/X ($cP^{-1}$) is preferably 0.007 to 0.060 cP-1, more preferably 0.010 to 0.060 cP-1, and still more preferably 0.015 to 0.050 $cP^{-1}$.

The 1/X ($cP^{-1}$) can be controlled by adjusting the kind of the repeating unit in the polymer contained in the polymer layer, the weight-average molecular weight, and the like.

—Glass Transition Temperature—

A glass transition temperature of the polymer layer is not particularly limited, but is preferably 50° C. or higher, more preferably 60° C. or higher, and still more preferably 65° C. or higher. The upper limit thereof is not particularly limited, but is 100% or less, preferably 90% or less and more preferably 80% or less.

The glass transition temperature of the polymer layer is obtained by peeling off the polymer layer from the cover film and heating the polymer layer to −50° C. to 100° C. under conditions of a temperature rise of 10° C./min using a differential scanning calorimeter (DSC).

The glass transition temperature can be adjusted, for example, by the type of the repeating unit included in the polymer and the content thereof.

—Thickness—

The thickness of the polymer layer is not particularly limited, but is preferably in a range of 1 to 100 μm, more preferably in a range of 10 to 40 μm, and still more preferably in a range of 10 to 30 μm.

—Refractive Index—

From the viewpoint of optics during observation with a microscope, a refractive index of the polymer layer is preferably 1.45 to 1.56 that is close to that of glass (refractive index: 1.52 to 1.56), more preferably 1.46 to 1.56, and still more preferably 1.47 to 1.56.

[Other Layers]

The cover film may include a layer other than the support and the polymer layer.

Examples of other layers include a backing layer.

In order to prevent scratches on the surface of the cover film, to prevent blocking more reliably during storage in an extremely high temperature environment, or to obtain a curling balance of the cover film, the backing layer may be provided on the back surface of the support (surface on a side opposite to the surface on which the polymer layer is provided).

Examples of a constituent material of the backing layer include a synthetic polymer having a high glass transition temperature, such as polystyrene and polymethyl methacrylate, and gelatin.

A total film thickness of the polymer layer and the support in the cover film is not particularly limited, but is preferably 250 μm or less, more preferably 200 μm or less, and still more preferably 150 μm or less from the viewpoint of operability and microscopic properties during observation with a microscope. From the viewpoint of handleability such as breakage resistance and sealing property, the lower limit thereof is preferably 50 μm or more.

<Manufacturing Method of Cover Film>

A method of providing the polymer layer on the support is not particularly limited, and examples thereof include coating with a coater or a spray, casting, and transfer. Among these, it is preferable that a coating liquid obtained by dissolving the polymer in a solvent is applied onto the support, and then the coating film is dried to form the polymer layer.

As the type of the solvent used in the coating liquid, a solvent in which the polymer is soluble and wettability is exhibited such that cissing on the support does not occur is preferably used. Examples of the solvent include toluene, ethyl acetate, butyl acetate, acetone, methyl ethyl ketone, and xylene.

In a case where a material which can dissolve the surface of the support or a material which can elute a low-molecular-weight component such as the plasticizer in the support is used as the solvent used in the coating liquid, the polymer penetrates the surface layer of the support such that the adhesive strength between the polymer layer and the support can be improved, and the peeling of the polymer layer can be prevented, and the formation of chips during cutting can be further suppressed.

From the above-described viewpoint, it is preferable that the coating liquid used for forming the polymer layer contains a solvent selected from the group consisting of ethyl acetate and butyl acetate, and it is more preferable to contain ethyl acetate.

A content of the solvent selected from the group consisting of ethyl acetate and butyl acetate in the coating liquid is not particularly limited, but from the viewpoint that the formation of chips during cutting of the cover film can be further suppressed, it is preferably 40% by mass or more, more preferably 60% by mass or more, and still more preferably 70% by mass or more with respect to the total mass of solvents contained in the coating liquid. The upper limit thereof is not particularly limited and may be 100% by mass or less, and from the viewpoint of further suppressing deformation of the substrate, it is preferably 90% by mass or less.

After applying the above-described coating liquid containing the polymer onto the support to form a coating film, it is preferable to perform a drying step of drying the coating film to remove the solvent from the coating film.

Examples of the drying treatment in the drying step include a method (for example, natural drying) of leaving the coating film to stand at room temperature (23° C.) for a predetermined time, blast drying of blasting gas to the coating film, heating drying of heating the coating film using a heating unit such as an oven, and a combination thereof. In the drying step, it is preferable to perform at least one of the blast drying or the heating drying, and it is more preferable to perform a combination of the blast drying and the heating drying.

A temperature of the gas used in the blast drying is not particularly limited, and is preferably 50° C. to 160° C. and more preferably 80° C. to 140° C. A speed (wind speed) of air flow in the blast drying is not particularly limited, but is preferably 3 to 15 m/s and more preferably 5 to 10 m/s. A treatment time of the blast drying is preferably 0.5 to 5 minutes. Examples of the gas used in the blast drying include air and nitrogen.

A temperature of the heating drying is not particularly limited, but is preferably 50° C. to 160° C. In addition, a heating time is preferably 0.5 to 5 minutes.

A method of forming the polymer layer containing the silane coupling agents is not particularly limited, and examples thereof include a first method of adding the silane coupling agents to a coating liquid for forming a polymer layer, applying the coating liquid containing the polymer and the silane coupling agents onto the support, and drying the coating film to form the polymer layer; a second method of applying a coating liquid obtained by dissolving the silane coupling agents in a solvent onto the surface of the coating film or the polymer layer containing the polymer, formed on the support, and drying the coating film to form a polymer layer; and a third method of simultaneously applying (multilayer application) a coating liquid containing the polymer and a coating liquid obtained by dissolving the silane coupling agents in a solvent onto the transparent support, and drying the coating film to form a polymer layer.

In the above-described first method to third method, in a case where a silane coupling agent is used as a raw material, a hydrolysis reaction and a condensation reaction of the silane coupling agent may proceed during the formation.

From the viewpoint that the silane coupling agents can be effectively utilized with a small amount, the above-described second method and the above-described third method are preferable. In the polymer layer containing the silane coupling agents, formed by the above-described second method and the above-described third method, the silane coupling agents are likely to be unevenly distributed on the surface of the polymer layer on a side opposite to the support.

The solvent of the coating liquid obtained by dissolving the silane coupling agents in the solvent used in the above-described second method and third method is not particularly limited as long as the silane coupling agent can be dissolved, and examples thereof include the solvents exemplified as the solvent capable of dissolving the above-described polymer. Among those, from the viewpoint of further improving the adhesiveness, ethyl acetate is preferable.

Applications

The cover film according to the embodiment of the present invention can be used as a cover film used for covering a test subject on a substrate. Among these, the cover film can be preferably used for preparing a specimen for microscopic observation, and can be more preferably applied to a microscope having an automatic enclosing device.

The substrate bonded to the cover film may be glass or a film-shaped material (resin or the like).

EXAMPLES

Hereinafter, the present invention will be described in more detail with reference to Examples.

The materials, the amounts of materials used, the proportions, the treatment details, the treatment procedure, and the like shown in Examples below may be modified as appropriate as long as the modifications do not depart from the spirit of the present invention. Therefore, the scope of the present invention should not be construed as being limited to Examples shown below.

<Production of Cover Film>

A cover film was produced by applying each coating liquid containing a polymer onto a support. Hereinafter, a detailed procedure will be described.

[Production of Support 1]

A support 1 was produced according to the following method.

(Preparation of Core Layer Cellulose Acylate Dope)

The following components were put into a mixing tank and the mixture was stirred to dissolve each component, thereby preparing a cellulose acetate solution A2a used as a core layer cellulose acylate dope.

Cellulose acetate having acetyl substitution degree of 2.88: 100 parts by mass

Mixture containing an aliphatic carboxylic acid ester oligomer (oligomer A1) described later and a compound represented by Formula (A-3), in which a mass ratio of the content of the oligomer A1:the content of the compound represented by Formula (A-3) was 4:1

| | |
|---|---|
| Methylene chloride | 430 parts by mass |
| Methanol | 64 parts by mass |

The addition amount of the above-described mixture contained in the cellulose ester solution A2a was adjusted such that the total content of a polyester A and the compound represented by Formula (A-3) contained in a support 1 which was produced by the following method using the cellulose ester solution A2a and a cellulose ester solution A2b described later was 12.3%.

A-3

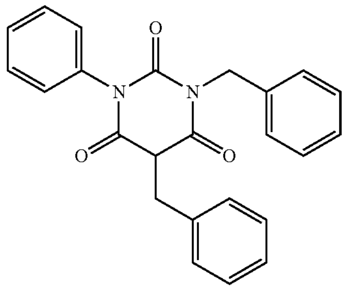

The oligomer A1 was an aliphatic carboxylic acid ester oligomer which is a condensate of 1,2-cyclohexyldicarboxylic acid and ethylene glycol, and has a terminal structure in which hydrogen atoms of hydroxyl groups at both terminals are substituted (sealed) with a cyclohexanoyl group. A number-average molecular weight of the oligomer A1 was 850.

(Preparation of Outer Layer Cellulose Acylate Dope)

10 parts by mass of a matte agent solution B2 having the following composition was added to 90 parts by mass of the above-described cellulose acetate solution A2a (core layer cellulose acylate dope) to prepare a cellulose acetate solution A2b to be used as an outer layer cellulose acylate dope.

| - Composition of matting agent solution B2 - | |
|---|---|
| Silica particles having an average particle diameter of 20 nm (AEROSIL R972, manufactured by Nippon Aerosil Co., Ltd.) | 2 parts by mass |
| Methylene chloride | 76 parts by mass |
| Methanol | 11 parts by mass |
| Cellulose acetate solution A2a (core layer cellulose acylate dope) | 1 part by mass |

(Production of Support 1)

The above-described core layer cellulose acylate dope and the above-described outer layer cellulose acylate dope were filtered through a filter paper having an average hole diameter of 34 μm and a sintered metal filter having an average hole diameter of 10 μm. The filtered core layer cellulose acylate dope and the filtered outer layer cellulose acylate dope were simultaneously cast in three layers from a casting port of a band casting machine onto a drum surface having a surface temperature of 20° C. to form a laminated film in which the core layer was sandwiched between two outer layers.

Subsequently, the laminated film was peeled off from the drum, and both ends of the laminated film in the width direction were fixed with a tenter clip. The laminated film fixed with the tenter clip was dried while being stretched in the width direction at a stretching ratio of 1.1 times. Thereafter, the laminated film was transported between rolls of a heat treatment device to be further dried, thereby producing a support 1.

The thickness of the support 1 was 118 μm, and the support 1 corresponded to a transparent support (Re<200 nm, Rth: −50 to 50 nm).

The lowest pKa among pKa's of hydrolyzates of the ester compounds contained in the support 1 was 4.0, which was a pKa of at least one hydrolyzate of the above-described compound represented by Formula (A-3). Therefore, the support 1 did not contain the specific ester compound.

[Synthesis of Polymer]

A polymer 1 used in Example 1 was synthesized by the following procedure.

At 80° C. in a nitrogen atmosphere, a mixed solution of 60 parts by mass of ethyl acrylate, 240 parts by mass of methyl methacrylate, 98 parts by mass of toluene, 66 parts by mass of ethyl acetate, and 0.7 parts by mass of azoisobutyronitrile was added to a mixture of 38 parts by mass of toluene and 25 parts by mass of ethyl acetate over 2 hours. Thereafter, the obtained mixed solution was reacted for 2 hours while maintaining the temperature at 80° C. Thereafter, 1.2 parts by mass of azoisobutyronitrile was added to the above-described mixed solution, and the mixture was subjected to a polymerization reaction at 90° C. to produce a polymer having a predetermined weight-average molecular weight, thereby obtaining a polymer solution 1 containing the polymer 1. A weight-average molecular weight Mw of the obtained polymer 1 was 100,000.

Polymers used in each of Examples and Comparative Examples are as shown in the table shown in the latter part. The ratio of each monomer was a weight ratio, and each polymer was synthesized by using the monomer according to the above-described procedure so as to be the ratio.

However, in Comparative Example 3, a polymer obtained by mixing ARON S-1017 and ARON S-1030C so that the weight ratio thereof was 2:3 was used.

[Preparation of Coating Liquid]

A polymer coating liquid 1 used in Example 1 was obtained by the following procedure.

Ethyl acetate and toluene were added to the above-described polymer solution 1 such that a concentration of solid contents of the polymer was 23% by mass and a ratio of the ethyl acetate to all solvents was 57% by mass, and the mixture was stirred to obtain a polymer coating liquid 1.

In addition, a silane coupling agent coating liquid 1 used in Example 15 was obtained by adding 109.89 parts by mass of ethyl acetate to 0.11 parts by mass of a silane coupling agent KBM403 (γ-glycidoxypropyltrimethoxysilane, manufactured by Shin-Etsu Chemical Co., Ltd.) to be a mixture.

Polymer coating liquids were also obtained in other Examples and Comparative Examples according to the above-described procedure.

[Formation of Polymer Layer]

A cover film 1 used in Example 1 was obtained by forming a polymer layer on a support according to the following procedure.

The polymer coating liquid 1 was applied onto the above-described support 1 using an applicator to form a coating film. A coating amount of the polymer coating liquid 1 was adjusted such that a thickness of the polymer layer after drying was 19 μm. As a drying step, the formed coating film was subjected to a blast drying treatment of blasting hot air at 100° C. at a wind speed of 3.2 m/s for 2 minutes, and then subjected to a heating and drying treatment using an oven to volatilize the solvent, thereby producing a cover film 1 consisting of the support 1 and the polymer layer containing the polymer 1. The total film thickness of the support 1 and the polymer layer in the cover film 1 was 137 μm.

Cover films used in other Examples and Comparative Examples were also obtained according to the above-described procedure.

In the coating step of the polymer layer for a cover film used in Example 15, the polymer coating liquid 15 and the silane coupling agent coating liquid 1 were applied by an extrusion multilayer coating method to form the coating film. A coating amount of the polymer coating liquid 15 was adjusted such that a thickness of the polymer layer after drying was 19 μm. A coating amount of the silane coupling agent coating liquid 1 was adjusted such that a coating concentration of the silane coupling agent with respect to the area of the surface of the transparent support was 13.5 mg/m$^2$.

<Measurement and Evaluation Method>

[Glass Transition Temperature of Polymer Layer]

The polymer layer was peeled off from the cover film, and the polymer layer was heated from −50° C. to 100° C. under the conditions of a heating rate of 10° C./min using a differential scanning calorimeter (DSC) to measure a glass transition temperature (Tg (° C.)) of the sample.

[Fracture Toughness Value]

A cube corner protrusion was pressed into the polymer layer with a load of 20 mN using a nanoindenter (iNano, G200 manufactured by Toyo Corporation), and a fracture toughness value $K_{IC}$ (MPa·m$^{0.5}$) was calculated by the above-described method. Table 1 described later shows the fracture toughness value $K_{IC}$ (MPa·m$^{0.5}$) in the following classification.

A: fracture toughness value $K_{IC}$ was 1.0 MPa·m$^{0.5}$ or more.

B: fracture toughness value $K_{IC}$ was 0.2 MPa·m$^{0.5}$ or more and less than 1.0 MPa·m$^{0.5}$.

C: fracture toughness value $K_{IC}$ was less than 0.2 MPa·m$^{0.5}$.

[Dissolution Rate]

A dissolution rate (g·m$^{-2}$·s$^{-1}$) was calculated according to the method described in the part of the requirement 1 above.

Specifically, the cover film was cut into a size of 24 mm in length×120 mm in width, and the cut cover film was immersed in 1200 mL of xylene in a stainless steel container for 60 seconds. The xylene was dried at 150° C. for 60 minutes. The dissolution rate (g·m$^{-2}$·s$^{-1}$) was calculated by dividing the difference between the mass before immersion and the mass after immersion by the area (m$^2$) of the cover film and the immersion time (s).

[1/X (Reciprocal of Viscosity)]

1/X ($cP^{-1}$) was calculated according to the method described in the part of the requirement 2 above.

[Chip Resistance]

After drying the cover film in an oven at 120° C. for 30 minutes to completely dry the cover film, a situation in a case where the cover film was cut with a push cutter was sensory-evaluated according to the following standard. As the evaluation of chip resistance, an evaluation of B or higher is preferable in practice.

A: no chips were substantially observed, and peeling and floating of the polymer layer were substantially not observed on the cut surface.

B: no chips were observed, but a slight floating of the polymer layer was observed on the cut surface.

C: there were many chips, and the polymer layer was peeled off and floated on the cut surface.

[Void Suppression Property]

Using an automatic enclosing device SCA-Film-J0 (manufactured by SAKURA SEIKI Co., Ltd.), a substrate (glass slide) and a cover film were bonded to each other to perform an enclosing treatment, thereby obtaining an enclosed substrate. Xylene was used as an enclosing solution. The size of the glass slide was 26 mm×76 mm, and the size of the cover film was 24 mm×50 mm.

After allowing the enclosed substrate to stand for 1 day, the enclosed substrate was visually observed to check the presence or absence of enclosing defects. In a case where two or more defects (generation of air bubbles and partial peeling) having a size of 1 mmφ or more were generated in the enclosed substrate, it was determined that the enclosed substrate had enclosing defects. An enclosing defect generation rate (%) was calculated by dividing the number of enclosed substrates in which the enclosing defects were generated by the number of all the enclosed substrates.

As the enclosing defect generation rate is lower, the void suppression property was excellent, and in practical use, the enclosing defect generation rate was preferably less than 8.0%.

[Adhesiveness]

The above-described enclosed substrate was dried in an oven at 50° C. for 1 week. After drying, the peeling of the cover film in the enclosed substrate was visually observed. The adhesiveness was evaluated according to the following classification based on the proportion of the area of the portion where the peeling occurred. It is preferable to have an evaluation of B or higher in practice.

A: area of the peeled portion was less than 5%.

B: area of the peeled portion was 5% or more and less than 30%.

C: area of the peeled portion was 30% or more.

<Result>

Table 1 shows the configuration of the cover film used in each of Examples and Comparative Examples, and the measurement and evaluation results.

In Table 1, the notation of "N k" in the column of the weight-average molecular weight indicates N×1000, and for example, "100 k" represents 100,000.

In the table, the following abbreviations are used for the monomers.

EA: ethyl acrylate
MMA: methyl methacrylate
BMA: n-butyl methacrylate
MEMA: 2-methoxyethyl methacrylate
EMA: ethyl methacrylate
iBMA: i-butyl methacrylate
tBMA: t-butyl methacrylate
BnMA: benzyl methacrylate
2EHMA: 2-ethylhexyl methacrylate
LMA: lauryl methacrylate
2EHA: 2-ethylhexyl acrylate
CHMA: cyclohexyl methacrylate

| | | Polymer layer | | | | | | | |
|---|---|---|---|---|---|---|---|---|---|
| | | Polymer | | | | | | | |
| | Support | Monomer 1 | Ratio | Monomer 2 | Ratio | Monomer 3 | Ratio | Weight-average molecular weight | Thickness (μm) |
| Example 1 | Support 1 | EA | 20 | MMA | 80 | | | 100k | 19 |
| Example 2 | Support 1 | EA | 20 | MMA | 70 | BMA | 10 | 100k | 19 |
| Example 3 | Support 1 | EA | 20 | MMA | 60 | MEMA | 20 | 100k | 19 |
| Example 4 | Support 1 | EA | 20 | MMA | 60 | EMA | 20 | 100k | 19 |
| Example 5 | Support 1 | EA | 20 | MMA | 30 | EMA | 50 | 100k | 19 |
| Example 6 | Support 1 | EA | 15 | MMA | 60 | EMA | 25 | 100k | 19 |
| Example 7 | Support 1 | EA | 15 | MMA | 50 | EMA | 35 | 100k | 19 |
| Example 8 | Support 1 | EA | 20 | MMA | 60 | iBMA | 20 | 100k | 19 |
| Example 9 | Support 1 | EA | 20 | MMA | 60 | tBMA | 20 | 100k | 19 |
| Example 10 | Support 1 | EA | 20 | MMA | 60 | BnMA | 20 | 100k | 19 |
| Example 11 | Support 1 | EA | 20 | MMA | 70 | 2EHMA | 10 | 100k | 19 |
| Example 12 | Support 1 | EA | 20 | MMA | 70 | LMA | 10 | 100k | 19 |
| Example 13 | Support 1 | EA | 20 | MMA | 60 | EMA | 20 | 145k | 19 |
| Example 14 | Support 1 | EA | 20 | MMA | 60 | EMA | 20 | 45k | 19 |
| Example 15 | Support 1 | EA | 20 | MMA | 60 | EMA | 20 | 100k | 19 |
| Example 16 | Support 1 | EA | 25 | MMA | 50 | EMA | 25 | 100k | 19 |
| Comparative Example 1 | Support 1 | EA | 30 | MMA | 70 | | | 50k | 19 |
| Comparative Example 2 | Support 1 | EA | 20 | MMA | 50 | BMA | 30 | 100k | 19 |
| Comparative Example 3 | Support 1 | ARON S-1017/ARON S-1030C (mixture of 40/60) | | | | | | 80k | 19 |

-continued

| | | | | | | | | | |
|---|---|---|---|---|---|---|---|---|---|
| Comparative Example 4 | Support 1 | 2EHA | 20 | CHMA | 80 | | | 80k | 19 |
| Comparative Example 5 | Support 1 | EA | 20 | MMA | 60 | EMA | 20 | 30k | 19 |
| Comparative Example 6 | Support 1 | EA | 20 | MMA | 80 | | | 145k | 19 |

| | Measurement | | | | Evaluation | | |
|---|---|---|---|---|---|---|---|
| | Polymer layer | | | | | Enclosing | |
| | Tg (° C.) | Fracture toughness value | Dissolution rate ($g\ m^{-2} \cdot s^{-1}$) | 1/X ($cP^2$) | Chip resistance | defect generation rate (%) | Adhesiveness |
| Example 1 | 76.6 | B | 0.04 | 0.013 | B | 0.2 | B |
| Example 2 | 67.1 | B | 0.06 | 0.018 | B | 1.3 | A |
| Example 3 | 58.1 | A | 0.10 | 0.019 | A | 3.0 | A |
| Example 4 | 67.2 | A | 0.09 | 0.019 | A | 1.7 | A |
| Example 5 | 56.2 | A | 0.24 | 0.044 | A | 3.7 | A |
| Example 6 | 71.7 | B | 0.06 | 0.024 | B | 0.6 | A |
| Example 7 | 67.9 | B | 0.08 | 0.023 | B | 0.6 | A |
| Example 8 | 67.7 | B | 0.12 | 0.024 | B | 2.0 | A |
| Example 9 | 74.6 | B | 0.10 | 0.026 | B | 0.5 | A |
| Example 10 | 67.9 | B | 0.07 | 0.028 | B | 0.5 | A |
| Example 11 | 64.0 | B | 0.13 | 0.025 | B | 2.7 | A |
| Example 12 | 58.8 | B | 0.13 | 0.025 | B | 2.5 | A |
| Example 13 | 69.6 | A | 0.06 | 0.002 | A | 5.3 | A |
| Example 14 | 67.9 | B | 0.13 | 0.046 | B | 1.5 | A |
| Example 15 | 67.2 | A | 0.09 | 0.019 | A | 1.7 | A |
| Example 16 | 63.0 | A | 0.14 | 0.022 | A | 1.7 | A |
| Comparative Example 1 | 58.0 | A | 0.14 | 0.001 | A | 10.0 | A |
| Comparative Example 2 | 51.0 | B | 0.28 | 0.036 | B | 9.4 | A |
| Comparative Example 3 | 61.3 | B | 0.20 | 0.004 | B | 8.0 | A |
| Comparative Example 4 | 47.9 | C | 0.22 | 0.050 | C | 3.0 | A |
| Comparative Example 5 | 67.0 | C | 0.14 | 0.064 | C | 12.5 | C |
| Comparative Example 6 | 79.0 | B | 0.009 | 0.004 | B | 15.0 | C |

From the results of Table 1, it was confirmed that the desired effects were exhibited in the cover film according to the embodiment of the present invention.

From the comparison between Examples 5 and 13 and other Examples, it was confirmed that, in a case where the above-described dissolution rate in xylene was 0.01 to 0.15 $g \cdot m^{-2} \cdot s^{-1}$ and the 1/X was 0.010 to 0.060 $cP^{-1}$, the void suppression property and the adhesiveness were excellent.

From the comparison between Example 4 and Examples 13 and 14, it was confirmed that, in a case where the weight-average molecular weight of the polymer was 50,000 to 140,000, either the chip resistance or the void suppression property was excellent.

From the comparison between Examples 3, 5, and 12 and Examples 1, 2, 4, 6 to 11, and 16, it was confirmed that, in a case where the glass transition temperature of the polymer layer was 60° C. or higher, the void suppression property and the adhesiveness were excellent.

From the comparison between Examples 4, 6, 7, and 16 and other Examples, it was confirmed that, in a case where the polymer includes the repeating unit derived from ethyl acrylate and the repeating unit derived from ethyl methacrylate, the void suppression property and the chip resistance were excellent.

What is claimed is:

1. A cover film used for covering a test subject on a substrate, the cover film comprising:

a support; and a polymer layer containing a polymer that includes a repeating unit derived from an alkyl acrylate having an alkyl group having 1 to 15 carbon atoms and a repeating unit derived from an alkyl methacrylate having an alkyl group having 1 to 15 carbon atoms, wherein a fracture toughness value of the polymer layer is 0.2 $MPa \cdot m^{0.5}$ or more, an in-plane retardation of the support at a wavelength of 590 nm is 1,000 nm or less, and a requirement 1 and a requirement 2 are satisfied, the requirement 1: a dissolution rate of the polymer layer in xylene is 0.01 to 0.25 $g \cdot m^{-2} \cdot s^{-1}$, the requirement 2: in a case where a viscosity of a xylene solution having a concentration of solid contents of 20%, which is obtained by dissolving the polymer layer in xylene, at 25° C. is defined as X, 1/X is 0.005 to 0.060 $cp^{-1}$.

2. The cover film according to claim 1, wherein the dissolution rate in xylene is 0.01 to 0.15 $g \cdot m^{-2} \cdot s^{-1}$, and the 1/X is 0.010 to 0.060 $cP^{-1}$.

3. The cover film according to claim 2, wherein a weight-average molecular weight of the polymer is 50,000 to 140,000.

4. The cover film according to claim 2, wherein a glass transition temperature of the polymer layer is 60° C. or higher.

5. The cover film according to claim 2, wherein the polymer is a polymer including at least two repeating units derived from a monomer selected from the group consisting of methyl methacrylate, ethyl acrylate, ethyl methacrylate, n-butyl methacrylate, i-butyl methacrylate, t-butyl methacrylate, and lauryl methacrylate.

6. The cover film according to claim 2, wherein the polymer includes a repeating unit derived from ethyl acrylate and a repeating unit derived from ethyl methacrylate.

7. The cover film according to claim 1, wherein a weight-average molecular weight of the polymer is 50,000 to 140,000.

8. The cover film according to claim 1, wherein a glass transition temperature of the polymer layer is 60° C. or higher.

9. The cover film according to claim 1, wherein the polymer is a polymer including at least two repeating units derived from a monomer selected from the group consisting of methyl methacrylate, ethyl acrylate, ethyl methacrylate, n-butyl methacrylate, i-butyl methacrylate, t-butyl methacrylate, and lauryl methacrylate.

10. The cover film according to claim 1, wherein the polymer includes a repeating unit derived from ethyl acrylate and a repeating unit derived from ethyl methacrylate.

11. The cover film according to claim 1, wherein the polymer includes a repeating unit derived from ethyl acrylate and a repeating unit derived from methyl methacrylate.

* * * * *